United States Patent
Morris (10) Patent No.: US 6,418,474 B1
(45) Date of Patent: Jul. 9, 2002

(54) DATA TRANSFER PROTOCOL FLOW CONTROLLER AND METHOD

(75) Inventor: Jeffrey Morris, El Cerrito, CA (US)

(73) Assignee: Peerless Systems Corporation, El Segundo, CA (US)

( * ) Notice: Subject to any disclaimer, the term of this patent is extended or adjusted under 35 U.S.C. 154(b) by 0 days.

(21) Appl. No.: 09/293,671

(22) Filed: Apr. 16, 1999

(51) Int. Cl.7 .............................................. G06F 13/00
(52) U.S. Cl. ....................... 709/233; 709/224; 709/229; 709/237; 710/60
(58) Field of Search ................................. 709/223, 224, 709/225, 230, 227, 229, 232, 233, 313; 710/52, 58, 60

(56) References Cited

U.S. PATENT DOCUMENTS

| | | | | |
|---|---|---|---|---|
| 4,985,890 A | * | 1/1991 | Matsumoto et al. ....... 370/94.1 |
| 5,367,523 A | * | 11/1994 | Chang et al. ................ 370/235 |
| 5,969,999 A | * | 10/1999 | Lee ............................. 365/194 |
| 6,226,097 B1 | * | 5/2001 | Kimura ...................... 358/1.14 |

* cited by examiner

*Primary Examiner*—Viet D. Vu
(74) *Attorney, Agent, or Firm*—Blakely Sokoloff Taylor & Zafman (57) ABSTRACT

An apparatus and method for controlling the data flow between a client computer and a diskless server is provided in which the diskless server inserts delays into the replies sent in response to the data requests of the client computer. The inserted delays prevent the client computer from terminating the communications session between the client computer and the diskless server because a time-out interval is exceeded. The diskless server may be a software-based print server stored in the memory of a printer. The delays are inserted into a reply when the amount of data in a buffer in the diskless server exceeds a predetermined threshold.

16 Claims, 7 Drawing Sheets

DATA TRANSFER PROTOCOL FLOW CONTROLLER AND METHOD

BACKGROUND OF THE INVENTION

This invention relates generally to a system and method for controlling the flow of data in a data transfer protocol and in particular to a system and method for controlling the flow of data between a diskless server and a client computer.

Some data transfer protocols are specifically intended to be used for the transfer of data between two personal computers connected to a computer network. An example of such a protocol is the server message block protocol (SMB) authored by Microsoft Corporation of Redmond, Wash. The SMB protocol is intended to permit data to be transferred efficiently between a server computer and a client computer connected together by a network. In the SMB protocol, a client computer ("client") sends a request to a server computer ("server") to access a server-based file data stream or a server-based print data stream. The server then sends a reply back to the client when the request for data has been fulfilled and completed. However, there is a time limit (known as a time-out interval) on a request and if the server has not replied to the client within the time-out interval, the client reports to its operating system that an error has occurred during the data transfer and terminates the data transfer session with the server. This permits the client computer to assume that a failure has occurred somewhere in the communications system and unilaterally terminate the communications session if the time-out interval is exceeded. The time-out interval may vary, but may be approximately 45 seconds for the SMB protocol.

In a typical server computer with some form of persistent storage device, such as a hard disk drive, a tape drive, an optical drive or the like, the time limit of the time-out interval poses no problem. Data may be written to the persistent storage device as it is received. The time-out interval is not exceeded since the replies may be sent back as soon as the data has been stored. Then, the data may be read from the disk later when timing is not as critical. For example, the data may be spooled to the server computer's disk and then later printed from the data stored on the disk.

In a typical printer, an image is broken down into a sequence of blocks of data by the client computer and each block of data may then be transferred to a print server connected to the printer using a data transfer protocol. As each block of data is received by the print server, it may be stored on a hard drive within the print server until a complete page has been received. As each block of data is received, a reply may be sent back to the client computer sending the block of data. The page is then interpreted by the print server and imaged by the printer. In this manner, data to be printed by the printer may be transferred to the printer using a typical data transfer protocol, such as SMB. With this typical printer, it is unlikely that the time-out interval will be exceeded since the data may be stored on the disk and then later printed from the disk.

The time limit of the time-out interval associated with the data transfer protocol, however, becomes more problematic when a diskless server system is attempting to communicate data using a data transfer protocol. An example of a typical diskless server system is a printer connected to a computer network, where one or more client computers also connected the computer network have access to the printer over the computer network. The problem is that certain types of data requests may require a lengthy computation prior to any reply being sent back to the client so that the time-out interval may be exceeded and the data flow may be terminated. For example, once the last block of data from a page to be printed is received, the page (which may have a complex image) is printed. This may require a larger amount of computation time in order to print the page. While requests which require the larger amounts of computation time are a small minority of the total number of data requests, the time between such requests and the associated replies may exceed the time-out interval since the diskless system is still performing some computation when the time-out interval expires. For example, over a sequence of data requests, a diskless printer can receive a page to be printed and then spend several minutes interpreting the page before sending a reply back to the client. The expiration of the time-out interval causes the data transfer session to be terminated by the client, which is disruptive since the data transfer session must be reestablished and the print job must be restarted. Similarly, if the data requests may be generated by a batch program, the batch program may unexpectedly and undesirably terminate because of the termination of the data transfer session.

Due to this time-out interval problem with data transfer protocols, users and developers may typically elect to use another data transfer protocol for communicating data to a networked printer to avoid the problem. It is desirable, however, to avoid the above-described time-out interval problem with these diskless systems while still utilizing a data transfer protocol with a time-out interval, such as SMB, and it is to this end that the present invention is directed.

SUMMARY OF THE INVENTION

The data flow control system and method in accordance with the invention solves the foregoing and other problems associated with data transfer protocols. In particular, the system prevents the time-out interval from being exceeded so that the data transfer session between the client computer and the diskless server is not terminated. In more detail, the system may include a protocol component, a buffer, and an application component, resident on a diskless server, which attempt to ensure that the time-out interval is not exceeded. The protocol component receives the data requests from the client computer and then, at the appropriate times, may communicate a reply back to the client computer within the time-out interval. The buffer temporarily stores the incoming data requests in the memory of the server while the application component interacts with the software application being executed by the server. While the amount of data in the buffer is below a predetermined level (indicating that the delay introduced by the server will not exceed the time-out interval), the protocol component does not add any delay into the response from the server. However, if the data in the buffer exceeds some predetermined level (indicating that the server is not keeping up with the incoming data transfers and may not be able to respond to the client within the time-out interval), the protocol component may insert delays into the replies being sent to the client in anticipation that the time-out interval may soon be exceeded.

In other words, although the server is able to respond to the current data requests within the time-out interval, time delays may be inserted into these replies so that the server has a chance to reduce the level of data in the buffer. Thus, rather than having a single delay for a particular block of data exceed the time-out interval and causing a termination of the data transfer session, the system may insert delays prior to the transfer of the block of data to prevent the problem. The inserted delays smooth out the irregularities of the supply of data by the client computers and the demand for data by the application component. Therefore, the system anticipates a time-out interval problem (based on the level of data in the buffer) and delays the replies to the client for some predetermined time so that the server may catch up to the data transfer requests.

Thus, in accordance with the invention, an apparatus within a diskless server for controlling the data flow between a client computer and the diskless server using a protocol is provided in which the diskless server must respond to the client computer within a time-out interval to avoid a termination of the data flow. The apparatus comprises a protocol component for receiving a data request from the client computer and for sending a reply back to the client computer when the data request has been fulfilled and an application component that may process the data request. The apparatus further comprises a buffer for storing the incoming data requests in a memory of the diskless server while the application component is processing other data requests. The protocol component delays the reply when the amount of data in the buffer exceeds a predetermined threshold so that the client computer does not terminate the data flow because of the time-out interval being exceeded.

A method for controlling the data flow between a client computer and a diskless server using a protocol in which the diskless server must respond to the client computer within a time-out interval is also provided. The method comprises receiving and processing a data request from the client computer, storing incoming data requests while the other data requests are being processed, and generating a reply to the client computer when the data request has been fulfilled. The step of generating the replies further comprises inserting a delay into the reply when the amount of data stored exceeds a predetermined threshold so that the client computer does not terminate the data flow because the time-out interval is exceeded.

In accordance with another aspect of the invention, an apparatus within a print server connected to a printer for controlling the data flow between a client computer and the print server using a server message block (SMB) protocol is provided in which the print server must respond to the client computer within a time-out interval. The apparatus comprises a protocol component for receiving a data request from the client computer and for replying to the client computer when the data request has been fulfilled. A print engine processes the data request in order to print the image corresponding to the data request. The apparatus further comprises a buffer for storing the incoming data requests in a random access memory of the print server while the application component is processing other data requests, and a delay inserter that delays the reply sent to the client computer when the amount of data in the buffer satisfies certain conditions to avoid the client computer terminating the data flow because a time-out interval is exceeded.

DETAILED DESCRIPTION OF A PREFERRED EMBODIMENT

The invention is particularly applicable to transferring data, using the SMB data transfer protocol from a client computer to a printer over a computer network, and it is in this context that the invention will be described. It will be appreciated, however, that the system and method in accordance with the invention has greater utility, and may find use with other types of data transfer protocols and other types of diskless server systems.

Figure 1:
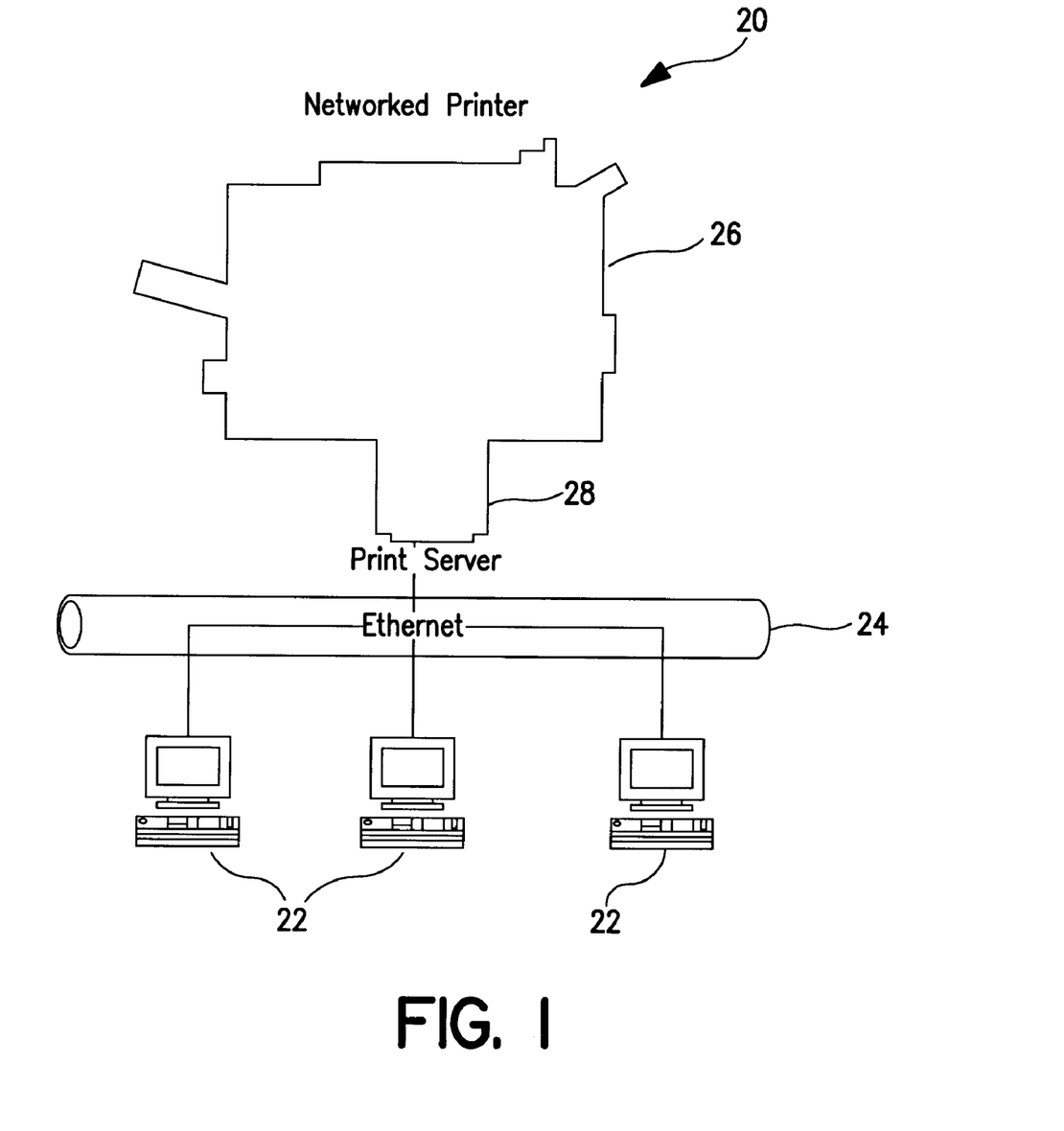
FIG. 1 is a block diagram illustrating one or more client computers and a networked printer connected to a computer network.

FIG. 1 is a block diagram illustrating an example of a computer network 20 in which one or more client computers 22 may be connected to a computer network backbone 24, such as an Ethernet network. The network may include a printer 26, which may comprise a printer server 28 which connects the printer to the computer network. For purposes of illustration only, a simple computer network having an Ethernet backbone with a few client computers connected to a single printer is shown, but the invention may also be used with more complex computer networks and with other types of server computers. The connection of the printer to the computer network permits any one of the client computers, using the computer network, to send print data to the printer. In the computer network shown, the print server 28 may be a network hardware device, such as a hardware network card. The print server 28 is preferably a software application residing in the memory of the printer that is executed by the central processing unit of the printer to provide the printer with a connection to the computer network. If the print server is a software application, no hardware network card is required.

In this example of the computer network, a server message block (SMB) data transfer protocol may be used to communicate data between the client computers and the print server. As described above, the SMB protocol has a predetermined time-out interval. If the print server does not reply to a data request by one of the client computers within the time-out interval, the data transfer session between the print server and the particular client computer may be terminated which will require the data transfer session to be reestablished which is inconvenient and undesirable. To better understand the problem, an example of the time-out problem in a typical disk-based server system and an example of a time-out problem in a diskless server system will be compared.

Figure 2:
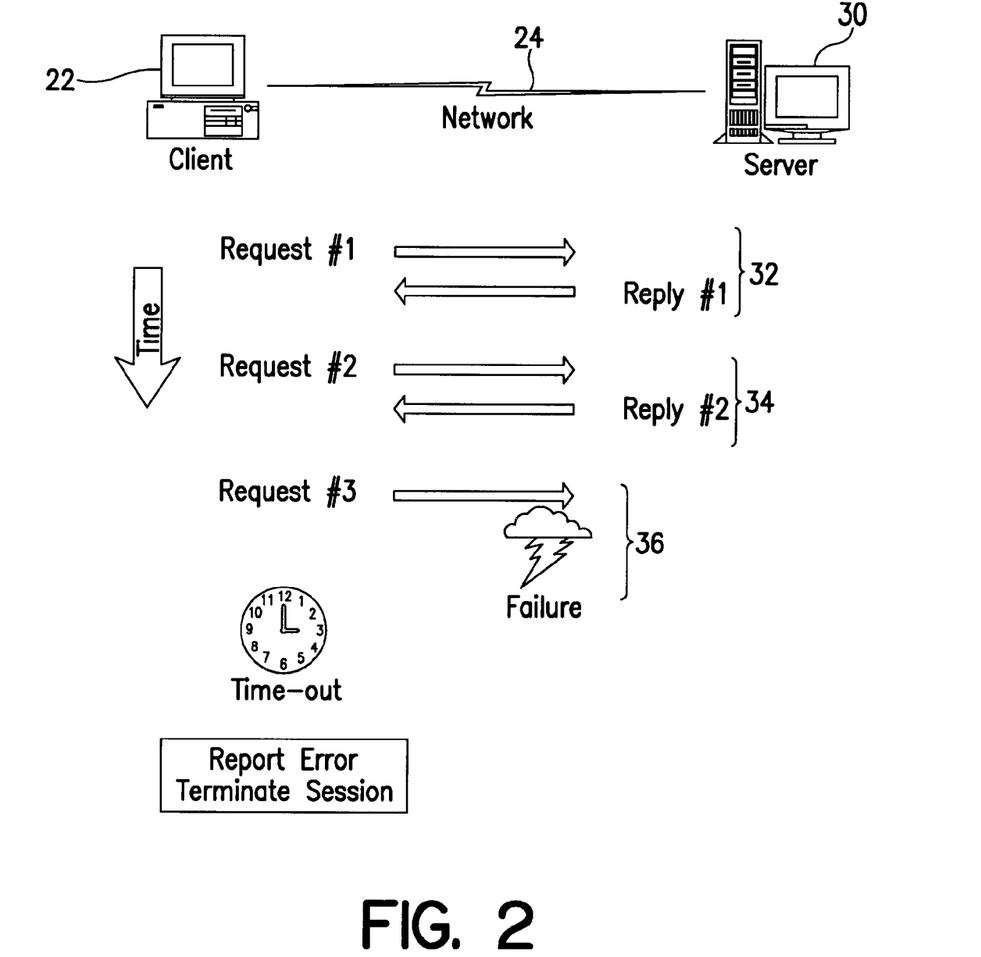
FIG. 2 is a diagram illustrating an example of normal time-out operation in a typical disk-based server.

FIG. 2 is a block diagram illustrating an example of normal time-out operation in a typical disk-based server system 30. In particular, the client computer 22 may request data from the server 30 over the network 24 during a sequence of communications pairs 32–36 consisting of a request for data from the client computer and a reply from the server 30 once the request has been satisfied. Thus, in this example, the client computer may submit a first and second request (Request #1 and Request #2) to the server and the server may send a first and second reply (Reply #1 and Reply #2) when the data requests have been completed. To avoid a time-out problem, each reply associated with each data request must be communicated back to the client computer within a predetermined amount of time known as the time-out interval. During the third communications pair 36, if a failure of the server occurs, the reply is not sent back to the client computer within the time-out interval so that the communications session between the client computer and the server is terminated. The time-out allows the software running on the client computer to wrap up and close down cleanly in the event of a failure. A failure which may cause a time-out problem in a typical disk-based server may include a lost communications channel, a hardware failure or a software crash. When the server has a disk, as above, the time-out intervals pose no special problem since the server writes the data to the disk as it arrives, replies within the time-out interval, and reads the data from the disk later. Now, an example of the time-out problem in a diskless server system will be described.

Figure 3:
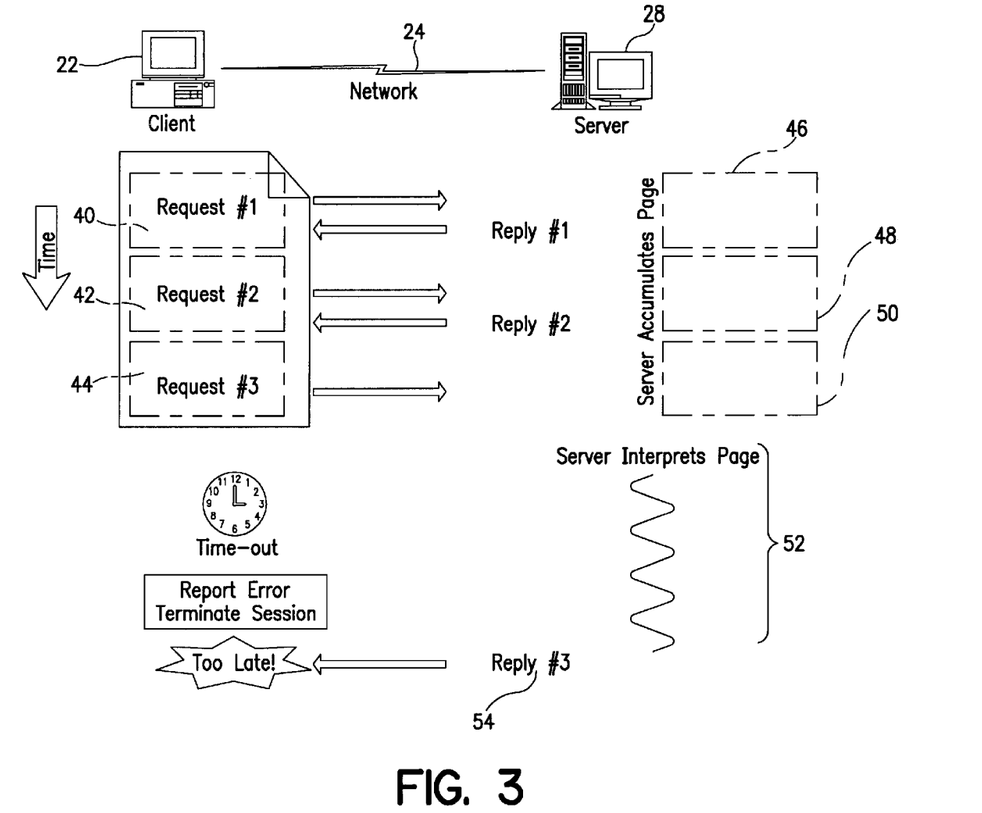
FIG. 3 is a diagram illustrating an example of a time-out problem in a diskless server system, such as a print server.

FIG. 3 is a diagram illustrating an example of the time-out problem associated with a diskless server 28. In this example, the client computer 22 requests that the diskless server system 28, which may be a software application such as a print server being executed by a networked printer, print the data by communicating over a network 24. As shown, the client computer may issue one or more data requests 40, 42, 44, which may each be a fragment of a page of information, to print in the context of a print server. For the first and second data requests, the print server 28 may accumulate the page fragments 46, 48 in memory and reply to the data requests by the client computer. However, with the third data request 44, the print server receives the remainder 50 of the page previously communicated to the printer in the first and second data requests. Once the printer receives the complete page (from the three data requests) it can spend many minutes interpreting, imaging and printing the accumulated page. During those minutes, the printer and the print server cannot accept new requests because, for example, its main memory might be fall and it has no disk on which to store the data. The delay 52 associated with processing the last request (the one carrying the last fragment of the page) may exceed the time-out interval and cause the client computer to terminate the session. Then, when a last reply 54 is finally attempted, it is too late since the communications session has already been terminated. Therefore, the communications session between the client computer and the print server is terminated even though no failure has occurred. Thus, with a diskless server system, the time-out interval unnecessarily terminates the communications session even though the only problem is that the printer associated with the print server needs more time to process a particular page of data. Now, a diskless server in accordance with the invention which solves the time-out interval problem will now be described.

Figure 4:
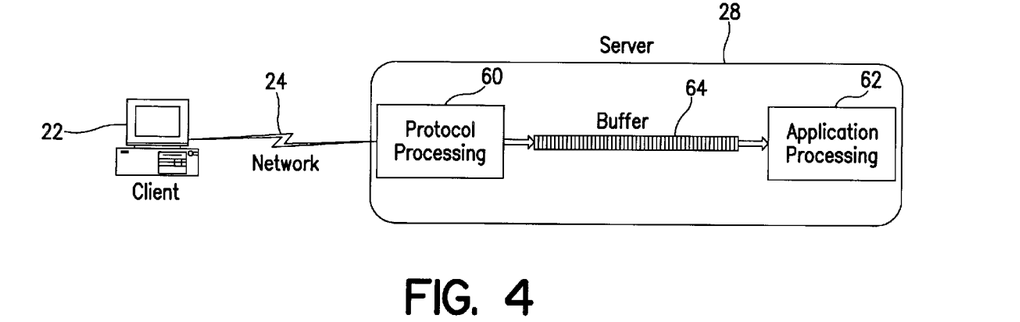
FIG. 4 is a block diagram illustrating more details of the diskless server in accordance with the invention.

FIG. 4 is a block diagram illustrating details of a diskless server 28 in accordance with the invention, which may be a software-based diskless print server. For purposes of discussion, a software-based print server will be described although the system and method in accordance with the invention may be used with other types of diskless server systems. The print server 28 may include a protocol component 60 which performs various protocol processing steps as described below and an application component 62 which performs various application processing steps as described below. The protocol component and the application component may be connected together by a storage means 64, which may be a buffer. The buffer may be implemented using memory space within the printer to form a first-in first-out (FIFO) queue of data. The buffer may temporarily store the print data received by the print server from a particular client computer. The amount of data in the buffer at any one time may also permit the protocol component 60 to determine when to delay the communication of the replies to the client computers, as described in more detail below, in order to avoid the termination of the data transfer session. The protocol component 60 may be a process (thread) within the print server 28 which sends and receives data over the computer network including receiving data requests from the client computers and communicating replies back to the client computers after each block of data has been received and stored in the memory. The application component 62 may be the process/thread which uses the data received from the client computers. In accordance with the invention, the protocol component and the application component may be implemented as a software application or as a hardware component. In the example of the print server, the application component 62 may be the printing software associated with the particular printer which images the data and sends the data to the print engine for printing. Normally, any delay in the printing of a document or page is introduced by the application component which is attempting to process the incoming image data.

In operation, as each block of data arrives at the server, the protocol component 60 may place the incoming block of data into a main-memory-resident buffer 64 within the server 28. The buffer may have a predetermined size. As additional blocks of data are communicated to the server 28, they are also stored in the buffer. As each block of data is needed for imaging by the application component 62, it is removed from the buffer. As described below in more detail, the buffer acts as a data reservoir to smooth out the irregularities of the supply of data by the client computers and the demand for data by the application component. In particular, the protocol component 60 continuously monitors the amount of data in the buffer 64 and, based on certain predetermined thresholds associated with the buffer, adds artificial delays into each reply back to the client computer. Now, more details about the buffer in accordance with the invention will be described.

Figure 5:
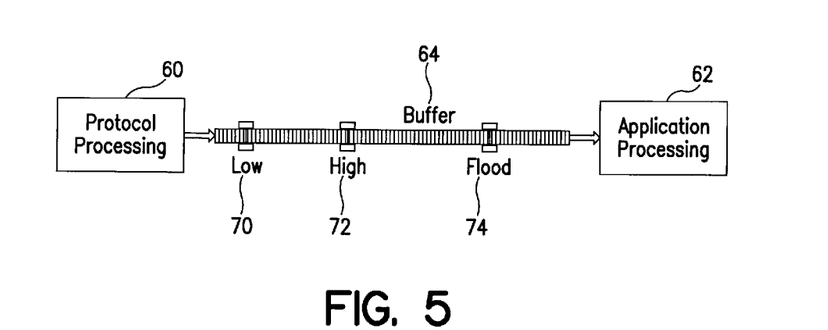
FIG. 5 is a block diagram illustrating more details of the buffer thresholds in accordance with the invention.

FIG. 5 is a block diagram illustrating more details of the buffer 64 in accordance with the invention. The buffer may have levels corresponding to a low threshold 70, a high threshold 72 and a flood threshold 74. Each threshold may cause a different reaction, as described below. The operation of the buffer will be briefly described here and a more detailed description of the operation of the buffer and the method for flow control will be described below with reference to FIGS. 6 and 7.

In operation, below the low threshold, the protocol component may not insert any delays into the replies. Once the amount of data in the buffer exceeds the high threshold, the protocol component may start to insert delays into the replies and may continue to insert delays until the amount of data in the buffer is once again below the low threshold. If the amount of data in the buffer exceeds the flood threshold, an error is reported to the client computer, such as an out of paper condition, but the data transfer session is not terminated so that the data transfer may be resumed once the problem is resolved (i.e., the application component has time to process the data which reduces the amount of data in the buffer below the flood threshold).

In summary, the buffer permits the flow controller in accordance with the invention to monitor the data in the diskless server so that a potential time-out interval problem may be avoided. The buffer permits the flow controller to determine when to add delay time into a reply. The flow controller therefore anticipates a time-out interval problem based on the buffer and inserts delays into replies to the client computer. The effect of inserting the delays is that the application component has more time to process data after each data request which means that the total amount of data in the buffer is reduced. For example, if the diskless server would typically reply 5 seconds after each data request and there are a total of 10 data requests, the application component would have a total of 50 seconds to process data. In accordance with the invention, however, assuming that a 25 second delay is inserted into each reply, the application component may have a total of 250 seconds to process data. Now, a method for controlling the flow of data in accordance with the invention will be described.

Figure 6:
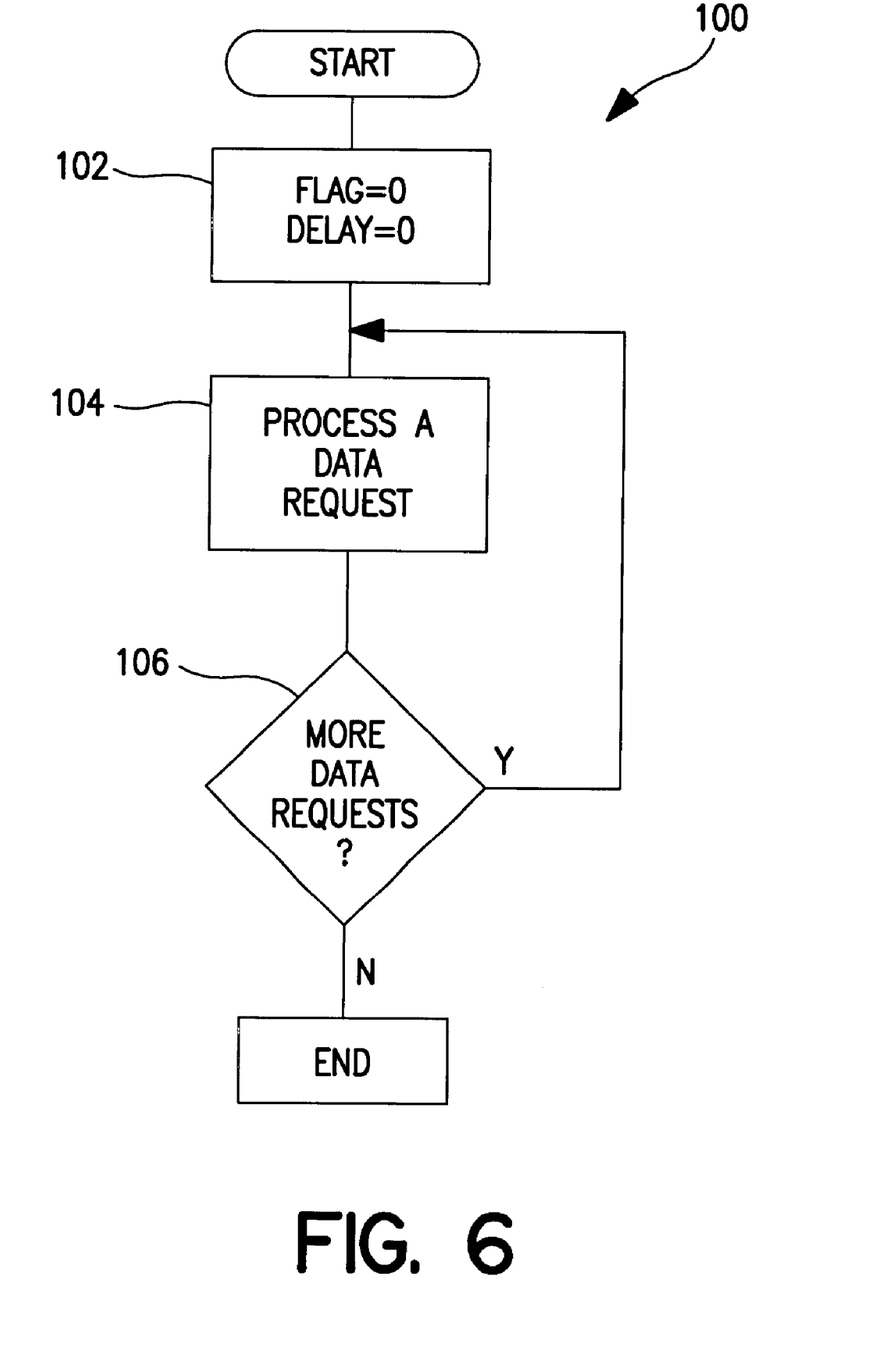
FIGS. 6 and 7 are flowcharts illustrating a method for controlling the flow of data between a server and a client computer in accordance with the invention.
Figure 7:
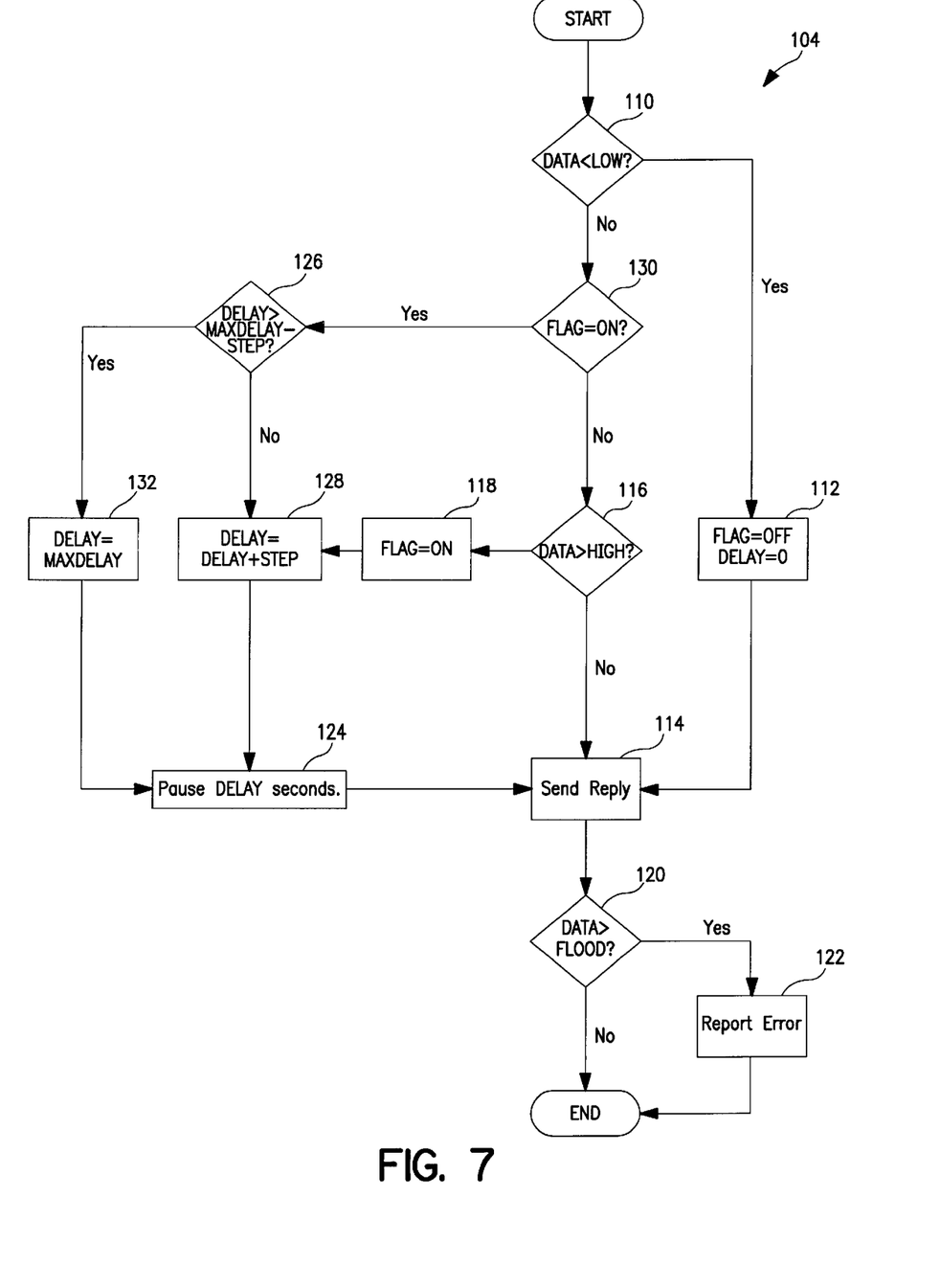

FIGS. 6 and 7 are flowcharts illustrating a method 100 for controlling the flow of data between a diskless server and a client computer in accordance with the invention. When the diskless server begins to receive data, the method is started and two variables used by the method are reset (i.e., Flag=0 and Delay=0) in step 102. The flag variable is a Boolean variable which is false (i.e., "0") if the delay insertion process is turned off and true (i.e., "1") when the delay insertion process has been activated based on the level of data in the buffer. The Delay variable stores the current amount of delay which may be introduced into a reply. The Delay variable may change and may vary between zero and a maximum delay time (MAXDELAY) with a predetermined number of steps of time (a STEP variable) between zero and MAXDELAY. In step 104, the method processes a data request from a client computer which may include inserting a delay into the reply. The steps performed for each data request will be described in more detail below with reference to FIG. 7. In step 106, the print server determines if there are any additional data requests from any client computer and the method ends if there are not any data requests to process. If there are more data requests to process, the method loops back to step 104 and another data request is processed. Now, more details of the steps for processing each data request will be described.

FIG. 7 is a flowchart illustrating more details of the method 104 for processing each data request in accordance with the invention. The processing of each data request may include determining if a delay should be inserted into the reply based on the level of data in the buffer and sending a reply back to the client computer within the time-out period so that the data transfer session is not terminated. The amount of data in the buffer at any time is an indication of the backlog of data which needs to be processed by the printer. The backlog of data is directly related to the complexity of the pages currently being imaged and printed by the printer since a more complex page takes longer to process which causes the amount of data in the buffer to increase. The increased amount of data in the buffer also may indicate that the time-out interval may be exceeded. In step 110, the method determines if the total amount of data currently in the buffer is less than the predetermined LOW threshold. If the amount of data is less than the low threshold, then the FLAG variable is turned OFF (which turns off the delay inserting process) and the delay is reset to zero in step 112. In other words, whenever the data in the buffer is below the low threshold, the delay insertion process is deactivated. If the data level is less than the low threshold, then a reply is sent to the client computer (with no delay inserted in this case) in step 114.

If the level of data in the buffer is above the low threshold, then it is determined if the FLAG variable is ON (i.e., the delay insertion process is activated) in step 130 and if the FLAG is OFF, then in step 116, the method determines if the amount of data in the buffer exceeds the high threshold. If the amount of data in the buffer exceeds the high threshold, then in step 118, the FLAG variable is set to "1" (activating the delay insertion process) and the Delay variable is set to a value equal to the old value of the DELAY variable (0 in this case) plus the STEP variable in step 128. In accordance with the invention, the delay insertion process is activated whenever the amount of data in the buffer exceeds the high threshold and remains active until the amount of data in the buffer falls below the low threshold. Next, the reply is delayed for DELAY seconds in step 124 and the reply is sent in step 124.

Returning to step 130, if the FLAG variable is ON (the delay insertion process is active), then it is determined if the current value of the DELAY variable is greater than MAXDELAY-STEP in step 126. If the current value of the DELAY variable is greater than MAXDELAY-STEP, then the DELAY is set to MAXDELAY (the maximum possible delay inserted) in step 132, the reply is delayed by DELAY seconds (MAXDELAY in this case) in step 124 and the reply is sent in step 114. If the current value of the DELAY variable is not greater than MAXDELAY−STEP, then the DELAY variable is set to DELAY+STEP in step 128, the replay is delayed for DELAY seconds in step 124 and the replay is sent in step 114 after the delay.

In step 120, the method determines, after the reply has been sent, whether the amount of data in the buffer exceeds the Flood threshold. If the amount of data in the buffer exceeds the flood threshold (indicating that the buffer may overflow shortly), then in step 122, the method reports an error/blockage to the client computer. The error/blockage may cause, for example, the client computer to display a misleading error message and pause, but it does not terminate the connection between the diskless server and the client computer. In the case of a print server, the server may report an "out of paper" condition. This report causes the client computer to delay sending additional data requests to the print server and gives the print server a chance to catch up with the data currently in the buffer so that the data transfer session is not terminated. The method for processing each data request has now been completed and the next data request is processed in a similar manner. Now, an example of the operation of the buffer in accordance with the invention will be described.

Figure 8:
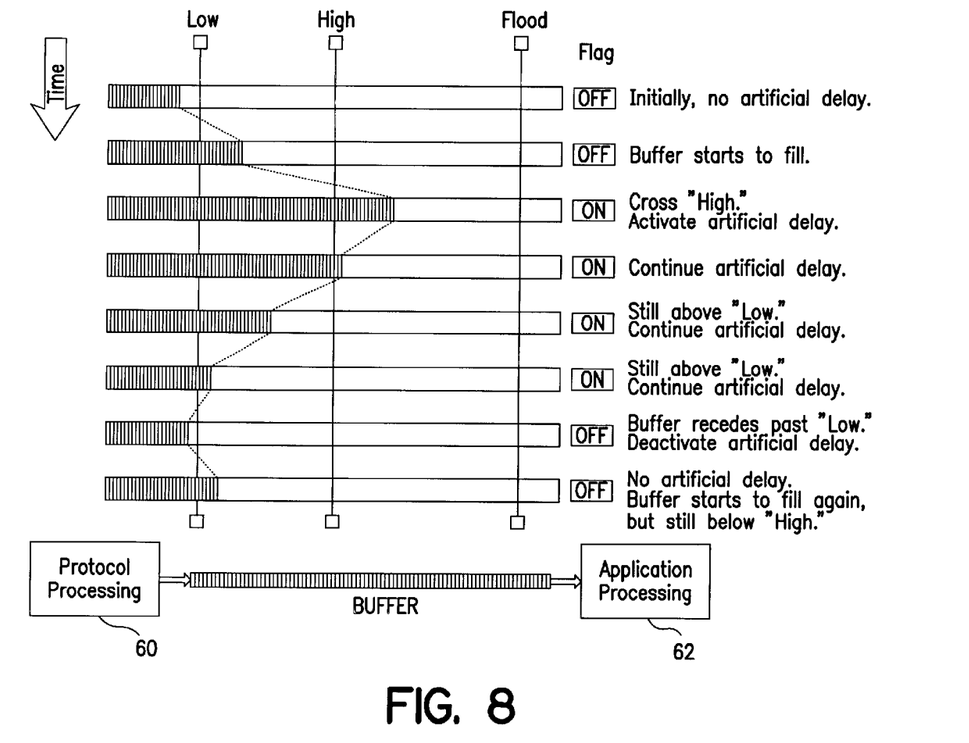
FIG. 8 is a diagram illustrating the operation of the buffer in accordance with the invention.

FIG. 8 is a diagram illustrating the operation of the buffer in accordance with the invention. In particular, the protocol component 60, the application component 62 and the buffer 64 are shown along with the low, high and flood thresholds 70–74 of the buffer. In addition, the status of the FLAG variable is also shown as the amount of data in the buffer changes. Thus, when the amount of data is below the low threshold, the FLAG is OFF so that the delay insertion process is deactivated. While the amount of data is greater than the low threshold, but less than the high threshold, the delay insertion process remains deactivated. Once the amount of data exceeds the high threshold, the delay insertion process is activated and will remain active until the amount of data in the buffer falls below the low threshold as shown in FIG. 8. Once the amount of data falls below the low threshold, the delay insertion process is deactivated (i.e., no delay is inserted into the replies being communicated to the client computer) until the amount of data in the buffer once again exceeds the high threshold.

In summary, as the amount of data in the buffer increases (indicating that the printer is processing a complex page of data), the method inserts delays into any replies which gives the application component more time to process the data which in turn avoids the time-out interval problem. In particular, the buffer permits the method to anticipate that the printer is taking more time to process a particular page (based on the increased data in the buffer) and to insert delays into the replies in an attempt to prevent a time-out interval problem. Now, an example of the values associated with each configurable variable in the above method will be described for illustration purposes.

To determine the values of the configurable parameters of the print server, the processing speed of the printer, the size of the data blocks being communicated to the printer and the size of the main memory of the printer may be analyzed to determine appropriate values for the particular printer. In this example, the data may be communicated in 2 Kbyte blocks and a 62 K memory may be used. In this particular printer, the print server may have a buffer size of 61,440 bytes, a delay step size of 10 seconds, a low buffer threshold of 5,120 bytes, a maximum delay of a reply (MAXDELAY) of 40 seconds, a high buffer threshold of 10,752 bytes and a flood buffer threshold of 55,296 bytes. With this particular choice of parameter values for this particular printer, the application component (printer) may work for up to approximately 7.5 minutes on a particularly demanding data request before the buffer area is exhausted and the time out interval may be exceeded. By further adjusting these parameter values, the server may be able to firer increase this duration at the expense of a larger buffer and a slower data transfer caused by the longer delays.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An apparatus within a diskless server for controlling the data flow between a client computer and the diskless server using a protocol in which the diskless server must respond to the client computer within a predetermined time-out interval to avoid a termination of the data flow, the apparatus comprising:
   a protocol component for receiving a data request from the client computer and for replying to the client computer when the data request has been fulfilled; and
   an application component for processing the data request;
   the protocol component comprising means for storing an incoming data request in the diskless server while the application component is processing another data request, and means for delaying a reply when the amount of data in the buffer exceeds a predetermined threshold to avoid termination of the data flow.

2. The apparatus of claim 1, wherein the storing means comprises a low threshold, a high threshold and a flood threshold, and said delaying means comprises means for deactivating the delaying means when the data in the storing means is below the low threshold, means for activating the delaying means when the data in the storing means has exceeded the high threshold until the data falls below the low threshold, and means for generating an error message when the data in the storing means exceeds the flood threshold, the error message enabling the application component to continue processing the data in the storing means without having the data flow terminated.

3. The apparatus of claim 2, wherein said diskless server comprises a print server connected to a printer, and said data requests comprise one or more fragments of image data that form a page of image data to be printed by the printer.

4. The apparatus of claim 3, wherein the protocol comprises a server message block (SMB) protocol.

5. The apparatus of claim 2, wherein the storing means comprises a first in first out (FIFO) buffer having a low, medium and high level of data in the buffer.

6. An apparatus within a diskless server for controlling the data flow between a client computer and the diskless server using a protocol in which the diskless server must respond to the client computer within a predetermined time-out interval, the apparatus comprising:
   means for receiving a data request from the client computer;
   means for processing the data request;
   means for replying when the data request has been fulfilled;
   the receiving means comprises means for temporarily storing an incoming data request while another data request is being processed, and means for delaying a reply by a predetermined time when the amount of incoming data exceeds a predetermined threshold.

7. The apparatus of claim 6 wherein the storing means comprises a low threshold, a high threshold and a flood threshold, and wherein said apparatus further comprises means for deactivating the delaying means when the data is below the low threshold, means for activating the delaying means when the data exceeds the high threshold and until the data falls below the low threshold, and means for generating an error message when the data exceeds the flood threshold, the error message causing a temporary interruption of data flow to the processing means.

8. The apparatus of claim 7, wherein said diskless server comprises a print server connected to a printer, wherein said data request comprises one or more fragments of image data that comprise a page of image data to be printed by the printer.

9. The apparatus of claim 8, wherein the protocol comprises a server message block (SMB) protocol.

10. A method for controlling the data flow between a client computer and a diskless server using a protocol in which the diskless server must respond to the client computer within a time-out interval, the method comprising:
    receiving a data request from the client computer;
    processing the data request;
    storing the received data request in a memory while the other data requests are being processed; and
    replying to the client computer when the received data request has been fulfilled, the replying comprising delaying the reply when the amount of data requests stored exceed a predetermined threshold so that the client computer does not terminate the data flow because the time-out interval is exceeded.

11. The method of claim 10, wherein the memory comprises a low threshold, a high threshold and a flood threshold, and wherein said inserting the delay comprises deactivating the delay insertion when the data in the memory is below the low threshold, activating the delay insertion when the data in the memory exceeds the high threshold, and generating an error message when the data in the memory exceeds the flood threshold, the error message permitting the application component to continue processing the data in the memory without having the data flow terminated.

12. The method of claim 11, wherein said diskless server comprises a print server connected to a printer, wherein said data requests comprise one or more pieces of image data that comprise a page of image data to be printed by the printer.

13. The method of claim 12, wherein the protocol comprises a server message block (SMB) protocol.

14. The method of claim 12, wherein inserting the delay comprises inserting an adjustable delay into the reply, the adjustable delay being incremented by a predetermined amount up to a maximum value each time the reply is sent.

15. The method of claim 14 further comprising resetting the adjustable delay when the amount of data in the memory falls below the low threshold.

16. An apparatus within a print server connected to a printer for controlling the data flow between a client computer and the print server using a server message block (SMB) protocol in which the print server must respond to the client computer within a predetermined time-out interval, the apparatus comprising:

a protocol component for receiving a data request from the client computer and for replying to the client computer when the data request has been fulfilled;

a print engine for processing the data request in order to print the image corresponding to the data request; and a buffer for storing the incoming data requests while the application component is processing other data requests and a delay inserter that delays the reply sent to the client computer when the amount of data in the buffer currently or has previously exceeded a high threshold and remains above a low threshold so that the client computer does not terminate the data flow because the time-out interval is exceeded.

* * * * *